US007181519B2

(12) United States Patent
Pillai et al.

(10) Patent No.: US 7,181,519 B2
(45) Date of Patent: Feb. 20, 2007

(54) DISTRIBUTED NETWORK MONITORING AND CONTROL SYSTEM

(75) Inventors: Vikram Pillai, Billerica, MA (US); Joseph Kinsella, Reading, MA (US); Patrick Bray, Northboro, MA (US); Noah White, Danvers, MA (US); Deborah MacCallum, Nashua, NH (US); Robert Klotz, Groton, MA (US); Gregory O. Bruell, Carlisle, MA (US)

(73) Assignee: Silverback Technologies, Inc., North Billerica, MA (US)

( * ) Notice: Subject to any disclaimer, the term of this patent is extended or adjusted under 35 U.S.C. 154(b) by 686 days.

(21) Appl. No.: 10/010,915

(22) Filed: Dec. 7, 2001

(65) Prior Publication Data

US 2002/0052950 A1    May 2, 2002

Related U.S. Application Data

(60) Provisional application No. 60/254,723, filed on Dec. 11, 2000.

(51) Int. Cl.
G06F 15/173    (2006.01)

(52) U.S. Cl. .................................... 709/224
(58) Field of Classification Search ................ 709/201, 709/223–224, 219, 229, 249; 370/229, 235, 370/252; 713/201
See application file for complete search history.

(56) References Cited

U.S. PATENT DOCUMENTS

| | | | | |
|---|---|---|---|---|
| 5,848,161 A | * | 12/1998 | Luneau et al. | 705/78 |
| 6,055,575 A | * | 4/2000 | Paulsen et al. | 709/229 |
| 6,079,020 A | * | 6/2000 | Liu | 713/201 |
| 6,085,243 A | * | 7/2000 | Fletcher et al. | 709/224 |
| 6,108,782 A | * | 8/2000 | Fletcher et al. | 713/153 |
| 6,148,337 A | * | 11/2000 | Estberg et al. | 709/224 |
| 6,473,863 B1 | * | 10/2002 | Genty et al. | 726/3 |
| 6,601,084 B1 | * | 7/2003 | Bhaskaran et al. | 718/105 |
| 6,662,221 B1 | * | 12/2003 | Gonda et al. | 709/223 |
| 6,751,677 B1 | * | 6/2004 | Ilnicki et al. | 719/316 |
| 6,754,831 B2 | * | 6/2004 | Brownell | 726/15 |
| 6,970,924 B1 | * | 11/2005 | Chu et al. | 709/224 |
| 6,973,491 B1 | * | 12/2005 | Staveley et al. | 709/224 |
| 6,982,953 B1 | * | 1/2006 | Swales | 370/218 |

* cited by examiner

*Primary Examiner*—William Vaughn
*Assistant Examiner*—Yemane M. Gerezgiher
(74) *Attorney, Agent, or Firm*—Weingarten, Schurgin, Gagnebin & Lebovici LLP (57) ABSTRACT

A distributed system and method for performing network monitoring including an infrastructure management appliance located within a customer premises. The infrastructure management appliance collects and aggregates relevant information regarding the status and performance of one or more of the customer's information technology resources. The infrastructure management appliance may support some number of integrated management and reporting applications. A secure virtual connection between the infrastructure management appliance and a remote data center may be used to convey management information from the infrastructure management appliance to the data center, and also to pass information defining the customer specific configuration and functional operation of the infrastructure management appliance from the remote data center to the infrastructure management appliance.

21 Claims, 7 Drawing Sheets

DISTRIBUTED NETWORK MONITORING AND CONTROL SYSTEM

CROSS REFERENCE TO RELATED APPLICATIONS

This application claims priority under 35 U.S.C. §119(e) to provisional patent application Ser. No. 60/254,723, entitled DISTRIBUTED NETWORK MONITORING AND CONTROL SYSTEM, filed Dec. 11, 2000.

STATEMENT REGARDING FEDERALLY SPONSORED RESEARCH OR DEVELOPMENT

N/A

BACKGROUND OF THE INVENTION

The present disclosure relates generally to management of information technology resources, and more specifically to a system and method for providing and operating a distributed network monitoring and control system.

As it is generally known, business organizations today face many challenges with regard to management of critical information technology ("IT") resources. Effective technology resource management must generally include monitoring the operational status and performance of various complex infrastructure resources, such as server systems, server software, and many other types of application software.

To address this general need, businesses deal with many specific associated problems. These include recruiting, training and retaining staff with the appropriate skills. Existing automated tool systems are generally not integrated, and provide large amounts of data without condensing it into usable information. Moreover, existing automated tools have high acquisition costs, and must typically be customized for each customer environment. Such customization results in prolonged integration times before the systems are operational.

In larger organizations, teams of IT personnel are employed for the dedicated purpose of keeping the company's data network operating at an optimal performance level. While effective, this approach introduces a significant amount of overhead to the business. In the case of a small to medium size business (SMB), the same set of information technology management challenges exist, but must typically be addressed without the luxury of an internal team dedicated to infrastructure management.

These problems are exacerbated by the fact that a company's information technology infrastructure must evolve over time to reflect the rapidly changing business landscape. Significant changes in the business landscape require businesses to continually introduce new products and/or services in a timely manner, in order to obtain market share and maintain customer satisfaction. These needs require that a business use a sufficiently flexible information technology management system to allow streamlined deployment of additional hardware and software to conveniently support expanded internal processes related to new or expanded product offerings.

A corporate information technology infrastructure often depends on internet service providers (ISPs), application service providers (ASPs), and co-locators (Co-Los). In this regard, ISPs provide internet connectivity, ASPs provide application licensing and integration, and Co-Los are used for data flow, security, and other infrastructure issues. However, these existing service providers each only generate isolated pieces of information that must be combined with other information in order to determine the root cause of many potentially complex types of problems, such as network performance degradation or failure.

Additionally, existing systems often create inefficiency by causing information overload, without information integration. Existing systems also frequently create a re-active rather than a pro-active management environment, by focusing on detection of problems that have already become apparent. Existing remotely based solutions generally rely heavily on Internet access stability, which may or may not be consistently present. Moreover, deficiencies of existing solutions increase the time and risk associated with the introduction of, and support for, complex customer applications.

For these reasons, it would be desirable to have a system for providing information technology infrastructure management that effectively collects, integrates, analyses and distributes actionable information in a pro-active manner. The system should allow applications to be hosted on the customer premises, thus allowing infrastructure control to remain with the customer, and thereby reducing dependency on the Internet. Additionally, the system should enable the use of pre-packaged monitoring, reporting and security application programs that provide immediate value upon service activation. The system should further enable an infrastructure management provider to be responsible for application program licensing fees, maintenance, patches and upgrades. The system should advantageously provide a single portal through which information may be obtained for multiple, integrated applications, and operate to reduce information from disparate reports, into a concise, actionable form.

BRIEF SUMMARY OF THE INVENTION

Consistent with the present invention, a distributed system and method for performing network monitoring is disclosed. The disclosed system includes an infrastructure management appliance located within a customer's premises to collect and aggregate relevant information regarding the status and performance of one or more information technology resources. The monitored information technology resources for a given customer may include networked devices such as client and server computer systems, and/or network services provided by network enabled, application programs. The disclosed infrastructure management appliance may support multiple, integrated management and reporting applications, locally within the customer's premises.

During operation, the disclosed infrastructure management appliance operates as a central infrastructure manager for information regarding the customer IT infrastructure, potentially using a number of different techniques. For example, the infrastructure management appliance's may act as a central collection point for event information sent to the appliance as the result of events occurring in various entities within the customer's IT infrastructure. Furthermore, the disclosed infrastructure management appliance may operate to actively manage customer IT resources at three levels. At a first level, the disclosed network management system performs status polling by polling one or more customer information technology resources. This first level may be considered the "lowest" of the three levels at which the disclosed network management system operates. An example of status polling that may be performed by the disclosed infrastructure management appliance is a PING (Packet INternet Groper), which is an Internet utility used to determine whether a particular IP address is online. At a second level, considered the next highest level of operation, the disclosed system performs "port level" transactions. An example of a port level transaction performed by the disclosed system is a connectivity check performed with respect to opening of a TCP connection. Such a connectivity check would include verification that the TCP connection in question had been established, but would not include actual sending of data over the connection. At a third, highest level of operation, the disclosed system performs what are referred to herein as "synthetic" transactions with respect to infrastructure resources. Examples of synthetic transactions include database queries to verify operation of a database resource, or purchasing an item through a Web enabled, electronic retailer ("e-tailer"). Information regarding the customer's IT infrastructure obtained through any or all of these techniques may then conveniently be provided by the disclosed system to the customer's IT personnel in an integrated fashion. The disclosed system establishes a secure virtual connection between the infrastructure management appliance and a remote data center. The secure virtual connection is used to convey management information passed from the infrastructure management appliance to the remote data center, and also to pass information defining the configuration and functional operation of the infrastructure management appliance from the remote data center to the infrastructure management appliance.

In one embodiment, when the infrastructure management appliance is initially deployed, the infrastructure management appliance communicates with the remote data center over a dial-up interface to obtain a core set of configuration parameters stored at the remote data center. These core configuration parameters provided from the remote data center include and/or reflect customer specific characteristics relevant to the deployment and operation of the infrastructure management appliance. These customer specific characteristics may be loaded into a database maintained in the remote data center, in a way that reflects information entered by a sales or service representative into an online form, and that may also reflects a purchase or service order for the respective customer. Such customer characteristics obtained over the dial-up connection between the infrastructure management appliance and the remote data center may, for example, further include parameters relevant to establishment of the secure virtual connection subsequently established between the infrastructure management appliance and the remote data center.

Further, in an illustrative embodiment, the disclosed infrastructure management appliance may operate to discover one or more customer specific, operational environment attributes. Such operational environment attributes may then be employed, for example, in forming a connection with the remote data center either over a dial up or Internet connection, and/or during monitoring of customer information technology resources.

In a further aspect of the disclosed system, functionality of the infrastructure management appliance may be conveniently modified through the secure virtual connection with the remote data center. Such upgrades and enhancements in functionality may be necessitated by changes in the customer's internal processes, and may be accomplished completely transparently to the customer using the disclosed system.

The disclosed system may be used to off-load fine-tuning and maintenance of system management and reporting applications, thus freeing up customer the customer's IT personnel for other uses. System management and reporting applications provided through the disclosed system may support complex business applications of the customer, thus reducing the need to add personnel dedicated to information technology management. This is particularly advantageous for growing, small to medium scale businesses that may, for example, need support for relatively complex applications, including complex financial services applications, and communication services.

Moreover, the disclosed system advantageously collects, integrates, analyses and distributes actionable information in a pro-active manner. The infrastructure management appliance of the disclosed system hosts management and reporting applications on the customer premises, thus allowing infrastructure control to remain with the customer, and reducing dependency on the Internet. Additionally, the disclosed system effectively enables the deployment of pre-packaged monitoring, reporting and security applications that provide immediate value upon service activation. The disclosed system may further be employed to enable an infrastructure management provider to be responsible for application licensing fees, maintenance, patches and upgrades. Finally, the disclosed system may provide a single portal through which information is obtained with regard to multiple, integrated applications, and which operates to reduce information from disparate reports, into concise, actionable information.

BRIEF DESCRIPTION OF THE SEVERAL VIEWS OF THE DRAWINGS

The invention will be more fully understood by reference to the following detailed description of the invention in conjunction with the drawings, of which.

DETAILED DESCRIPTION OF THE INVENTION

U.S. Provisional Patent Application Ser. No. 60/254,723, entitled DISTRIBUTED NETWORK MONITORING AND CONTROL SYSTEM, filed Dec. 11, 2000, is hereby incorporated herein by reference.

Figure 1:
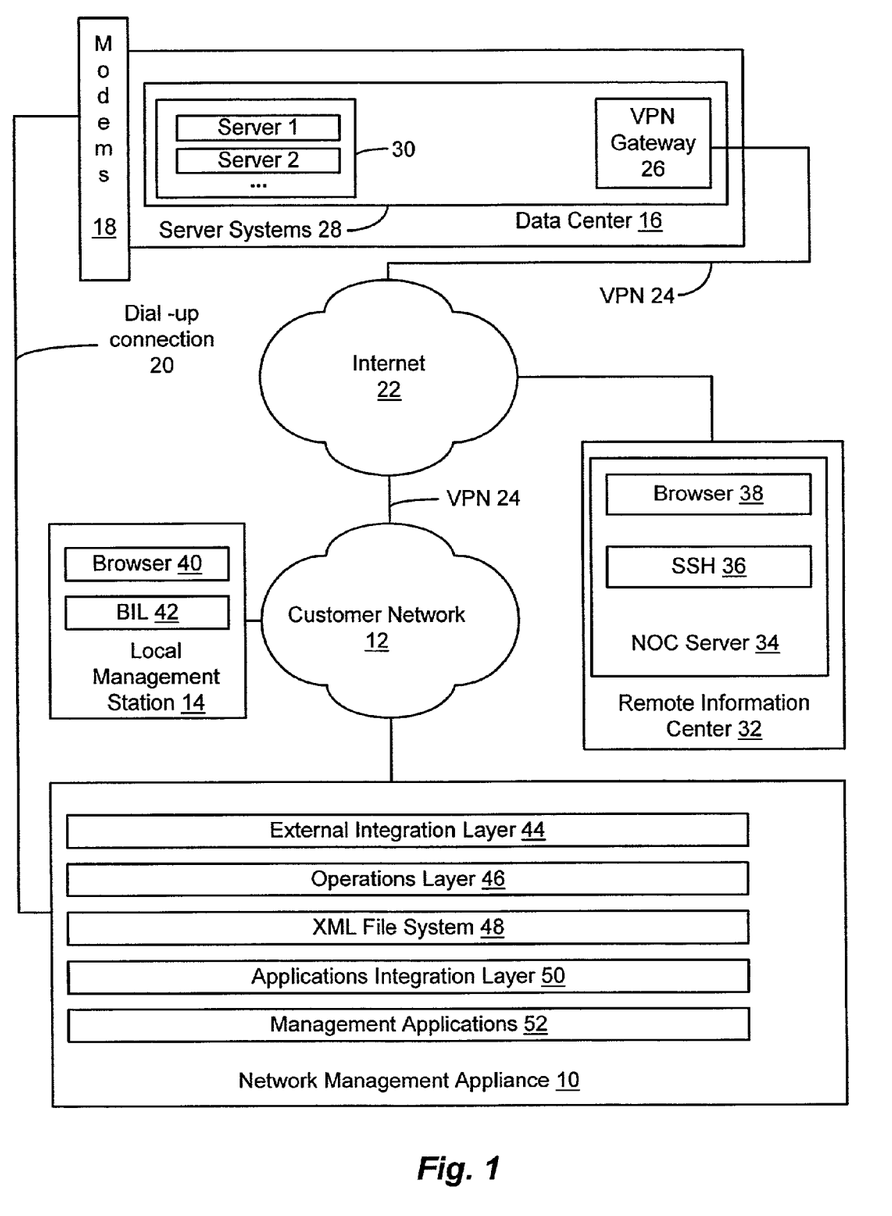
FIG. 1 shows a distributed system for network management in accordance with an embodiment of the disclosed system.

FIG. 1 shows an illustrative embodiment of a distributed system for network management, including an infrastructure management appliance 10 communicably connected to a customer computer network 12. A local management station 14 is also shown connected to the customer computer network 12. The infrastructure management appliance 10 is shown further connected over a dial-up connection 20 to one of a number of modems 18 associated with a Remote Data Center 16.

A secure connection, shown for purposes of illustration as the secure Virtual Private Network (VPN) 24, is used by the infrastructure management appliance 10 to communicate with the Remote Data Center 16 through the internet 22. The infrastructure management appliance 10 may also communicate over the internet 22 with a remote information center 32. While the secure connection 24 is shown for purposes of illustration as a VPN, the present system is not limited to such an embodiment, and any other specific type of secure connection may be used, as appropriate for a given implementation, as the secure connection 24.

The infrastructure management appliance 10 may, for example, consist of a computer system having one or more processors and associated program memory, various input/output interfaces, and appropriate operating system and middleware software. Based on such a hardware platform, the infrastructure management appliance 10 can support various functions of the disclosed system in software. For example, in FIG. 1, the infrastructure management appliance 10 is shown including several layers of software functionality, specifically external integration layer 44, operations layer 46, XML file system 48, applications integration layer 50, and management applications 52.

In the illustrative embodiment of FIG. 1, the applications integration layer 50 is operable to normalize data received from management applications 52 before inserting such data into a database on the infrastructure management appliance 10. The applications integration layer 50 within the infrastructure management appliance 10 operates to provide functionality related to polling, event detection and notification, process control, grouping, scheduling, licensing and discovery.

The external integration layer 44 operates to provide reporting services. In the illustrative embodiment, the external integration layer 44 consists of application server software containing business logic that transforms data inserted into the database by the application integration layer into actionable business information. For example, such a transformation may include converting an absolute number of bytes detected during a period of time moving through a particular port of a customer's device into a percentage of the potential maximum bandwidth for that port used. The external integration layer 44 further operates to perform user management, including management of user preferences, for example as set by customer IT support personnel. These user preferences may, for example, include various user-customizable display parameters, such as the size and order of columns within the user display, and may be managed in cooperation with the browser integration layer 42 in the local management station 14.

The operations layer 46 is the operational portion of the infrastructure management appliance environment, and is the contact point for all communications with the remote data center. In the illustrative embodiment, a master controller process in the operations layer 46 is responsible for provisioning, functionality upgrades and process control within the Infrastructure Management Appliance. Other portions of the operations layer 46 perform remote monitoring, security, trending and paging.

The local management station 14 is also shown including layers of functionality consisting of an Internet browser program 40, and a Browser Integration Layer (BIL) 42. The local management station 14 may also, for example, consist of a computer system, such as a personal computer or workstation, having one or more processors and associated memory, a number of input/output interfaces, and appropriate operating system and middleware software. Accordingly, the functionality layers 40 and 42 may be provided in software executing on the local management station 14. In the illustrative embodiment, the browser integration layer (BIL) 40 includes XSL related functionality that efficiently provides a user-configurable user interface.

The remote information center 32 includes a network operation center (NOC) system 34, which may also be embodied as a computer system including one or more processors, associated memory, various input/output interfaces, and appropriate operating system and middleware software. The NOC system 34 includes an Internet browser program 38, and Secure Shell (SSH) program code 36. The SSH program code 36 is depicted only for purposes of illustration, as an example of an interface and protocol for controlling access to the NOC system 34 within the remote information center 32. During operation of the disclosed system, appliance service support personnel may securely access the Infrastructure Management Appliance 10 through the SSH program code 36 and the browser program 38.

The Remote Data Center 16 is shown including VPN gateway functionality 26, and a number of server systems 28. The server systems 28 may consist of computer hardware platforms, each including one or more processors and associated memories, together with various input/output interfaces, as well as appropriate operating system and middleware software. The server systems 28 support multiple application server software 30. Functionality provided by the servers 30 on the server systems 28 in the Remote Data Center 16 may, for example, include data connectivity, voice connectivity, system control, system monitoring, security, and user services. Specific functions that may be provided by the server software 30 are further described below.

The data connectivity functionality provided by the Remote Data Center 16 includes both software and the modems 18, which serve as backup connectivity between the Remote Data Center 16 and the Infrastructure Management Appliance 10. The data connectivity provided by the Remote Data Center 16 further includes the VPN (Virtual Private Network) gateway 26, supporting the VPN 24, thus providing the primary connectivity between the Remote Data Center and the Infrastructure Management Appliance 10. Data connectivity provided by the server software 30 in the Remote Data Center 16 may additionally include a Web proxy server allowing customer support representatives to access Infrastructure Management Appliances 10 in the field.

The system control functionality provided by the server software 30 in the Remote Data Center 16 may include, for example, provisioning support in the form of a customer service tool for initial and ongoing configuration of the Infrastructure Management Appliance 10, as well as for configuration of data and systems within the Remote Data Center 16.

System monitoring functionality provided by the server software 30 in the Remote Data Center 16 may, for example, include console services, such as a central console for monitoring the status of multiple infrastructure management appliances. An example of console services are those operations described in connection with the "sweep and audit" function 114 shown in FIG. 5. For example, console services may provide statistics on how many times a customer has logged in to an infrastructure management appliance, and/or the average CPU utilization of an infrastructure management appliance. The monitoring of CPU utilization within an infrastructure management appliance is an example of steps taken in the disclosed system to support proactive management of an infrastructure management appliance. Such proactive management may enable further steps to be taken to address utilization issues without waiting for the customer to notice a problem, and potentially without customer action or interference with the customer's system operation.

In addition, event reporting functionality within the Remote Data Center 16 may include an event notification system such as a paging interface, electronic mail, instant messaging, or some other appropriate automated system for reporting issues that may be detected with respect to such multiple Infrastructure Management Appliances 10.

The disclosed system further includes a number of security features, including "hardened" Infrastructure Management Appliance 10 and Remote Data Center 16, as well as secure communications between the appliance service support personnel and the Infrastructure Management Appliance 10, and between the customer's IT personnel and the Infrastructure Management Appliance 10. In order to provide such security, the disclosed system may employ various technologies, including firewalls.

With regard to security functionality provided by the servers 30 in the Remote Data Center 16, an LDAP (Lightweight Directory Access Protocol) server program may be used to store account information for authentication purposes, such as a number of user accounts for appliance service support personnel having access to the disclosed system. Additionally, TACACS (Terminal Access Controller Access Control System) is an example of an access control protocol that may be used to authenticate appliance service support personnel logging onto the disclosed system, for example by maintaining username/password combinations necessary for accessing Remote Data Center 16 resources through the modems 18.

The Remote Data Center 16 may further include a Certificate Authority (CA) function that stores digital certificates for supporting SSL connections between infrastructure management appliances and customer IT personnel, as well as a Firewall (FW) function that may be used to form protected areas between the components of the disclosed system. For example, a domain edge type firewall may be used to protect the Remote Data Center 16 itself, while individual firewalls may also be provided for individual machines within the Data Center 16. With regard to securing access between the appliance service support personnel and the infrastructure management appliance, a protocol such as the secure shell (SSH) may be employed.

One example of user services functionality that may be provided by the Remote Data Center 16 is referred to herein as "trending". The disclosed trending function of the Remote Data Center 16 stores raw monitoring data in a trend database maintained by the Infrastructure Management Appliance 10, and additionally in a supplemental database maintained in the Remote Data Center 16. For a given customer, trend data may be accumulated between the Infrastructure Management Appliance 10 and the Remote Data Center 16 over a significant period of time, covering up to a number of years. In connection with this capability, the Remote Data Center 16 may also include a "warehouse" database derived from the trend databases of multiple Infrastructure Management Appliances 10, but that has had all of the customer specific information removed.

Figure 2:
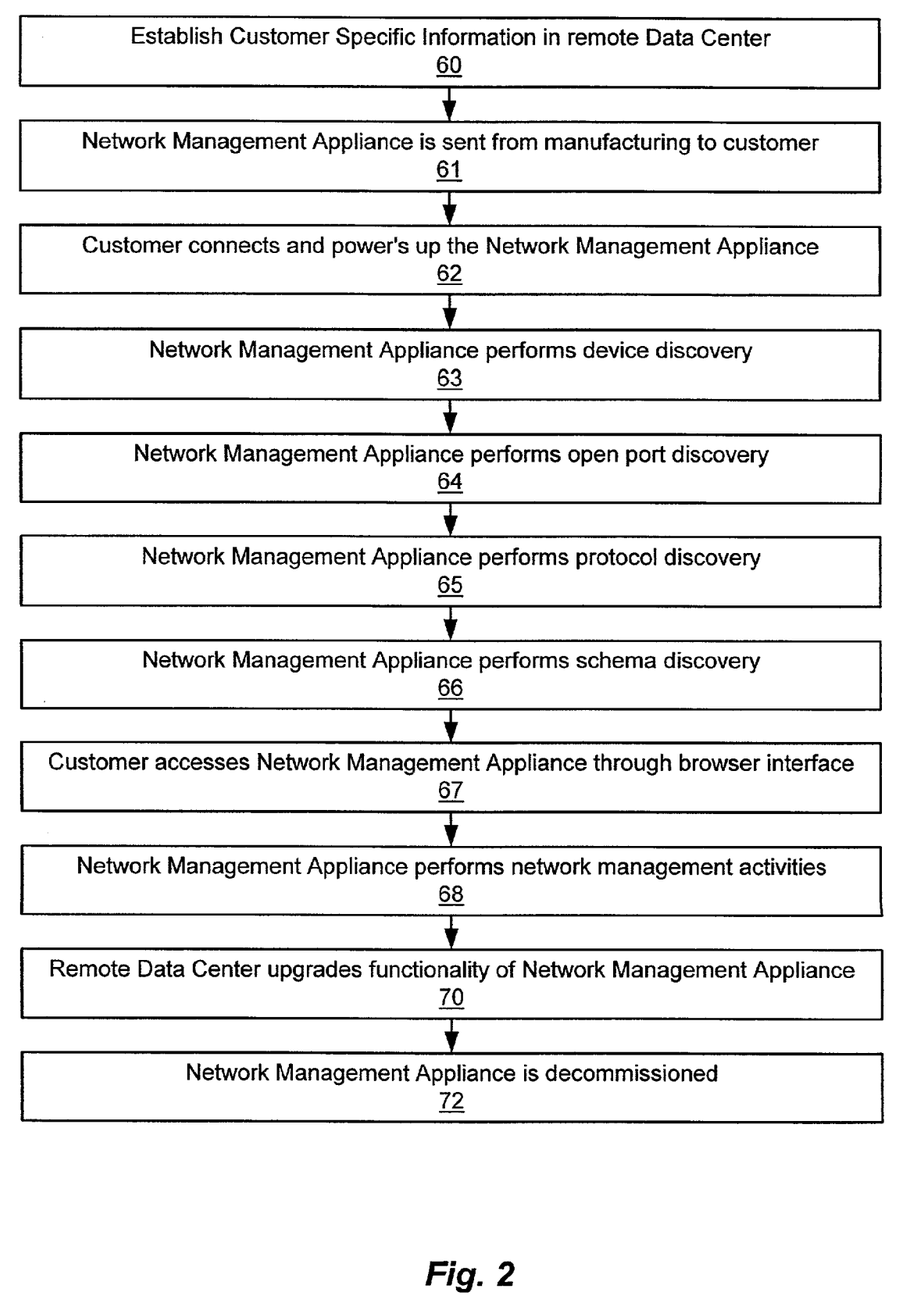
FIG. 2 is a flow chart illustrating steps performed during operation of an illustrative embodiment of the disclosed system.

FIG. 2 is a flow chart showing steps performed during operation of the disclosed system. At step 60, customer specific information is established in the Remote Data Center 16. The information established in the Remote Data Center 16 typically includes the types and identities of resources to be managed for a given customer, and other characteristics of the execution environment in which a given Infrastructure Management Appliance 10 is to operate.

At step 61, an Infrastructure Management Appliance, such as the Infrastructure Management Appliance 10 of FIG. 1, is shipped from the manufacturing function of the Infrastructure Management Appliance provider to the customer. Advantageously, the Infrastructure Management Appliance 10 need not be loaded with any customer specific characteristics by the manufacturing function. In this way, the disclosed system enables similarly configured "vanilla" Infrastructure Management Appliances 10 to be shipped directly from manufacturing to various different customers.

At step 62, the Infrastructure Management Appliance 10 is delivered to the customer. Further at step 62, the customer connects the Infrastructure Management Appliance 10 to the customer's communication network, and then "power's up" the Infrastructure Management Appliance 10. The Infrastructure Management Appliance 10 then begins operation, and performs a series of self configuration steps 63–66, in which the Infrastructure Management Appliance 10 determines the customer's specific operational environment and requirements. At step 63, the Infrastructure Management Appliance 10 performs device discovery operations to determine a number of IP addresses that are currently used in association with devices present in the customer's network. At step 64, the Infrastructure Management Appliance 10 operates to determine the ports (UDP or TCP) that are open with respect to each of the IP addresses detected at step 63. Following step 64, in step 65, the Infrastructure Management Appliance 10 determines which protocols are in use within each port discovered at step 64. For example, step 65 may include a relatively quick test, like a telnet handshake over a port conventionally used for telnet to confirm that telnet is in use. At step 66, the Infrastructure Management Appliance 10 operates to perform schema discovery. Step 66 may include discovery of schema or version information, such as determining the specific information available through a protocol determined to be in use, such as SNMP (Simple Network Management Protocol). For example, certain information may be available through SNMP on certain customer machines, as indicated by the SNMP schema defining the MIB ("Management Information Base") for a given device. Accordingly, such a determination at step 66 may indicate what information is available via SNMP on a given machine, including machine name, total number of packets moving through the device, etc. Other application schema may also be determined at step 66, such as MOF (Managed Object Format) schema. Moreover, during the discovery steps 63–66, the disclosed system may, for example determine whether certain database applications (such as ORACLE and/or SYBASE) are present on their standard port numbers.

At step 67, the customer may access the Infrastructure Management Appliance 10 in order to enter specific configuration information. For example, the customer IT personnel may employ the Browser 40 in the Local Management Station 14 of FIG. 1 in order to access the Infrastructure Management Appliance 10. Step 67 allows the customer to enter in configuration data not already available from the Data Center. For example, the customer IT personnel may customize the Infrastructure Management Appliance 10 during by initially provisioning the appliance at initialization time with basic operational parameters, and then subsequently provide further configuration information such as information relating to subsequently added users. Moreover, some managed customer resources require user names and passwords to be monitored, and such information may also be provided by the customer IT support personnel after power up at the customer site. Additionally, even if a resource is discovered automatically by the Infrastructure Management Appliance 10 in steps 63–66, the customer IT personnel may wish to disable management of the resource. This may be the case, for example, where a customer is only responsible for a subset of the total number of machines within the network, as is true for a department within a University network.

At step 68, the Infrastructure Management Appliance 10 enters a steady state, collecting information with regard to the operational status and performance of information technology resources of the customer network 12. The information collection performed at step 68 may include both event monitoring and active information collection, such as polling. For example, the activities of the Infrastructure Management Appliance 10 in this regard may include polling various managed objects using a management protocol such as SNMP (Simple Network Management Protocol). Such activities may further include use of a protocol such as PING (Packet INternet Groper), which uses a request/response protocol to determine whether a particular Internet Protocol (IP) address is online, and accordingly whether an associated network is operational. While SNMP and PING are given as examples of protocols that may be used by the Infrastructure Management Appliance at step 68, the disclosed system is not limited to use of SNMP or PING, and any appropriate protocol or process may be used as part of the network management activities performed by the Infrastructure Management Appliance 10 at step 68 for monitoring and acquiring information. Additionally, the Infrastructure Management Appliance 10 may issue service requests ("synthetic service requests") to various services that are being monitored, in order to determine whether the services are available, or to measure the responsiveness of the services.

With regard to event monitoring, the Infrastructure Management Appliance 10 may, for example, operate at state 68 to receive and collect trap information from entities within the customer IT infrastructure. For example, SNMP traps provided by agents within various devices within the customer IT infrastructure may be collected and presented to customer IT support personnel within a single integrated event stream. Another example of an agent that could provide event information to the Infrastructure Management Appliance is an agent that scans logs created by a service or device. When such an agent detects an irregularity within such a log, it would provide an event message to the Infrastructure Management Appliance. While SNMP traps are described as an example of an event message, and agents are described as example of an event source, the present system is not so limited, and those skilled in the art will recognize that various other event messages and/or event sources may be employed in addition or in the alternative.

Figure 3:
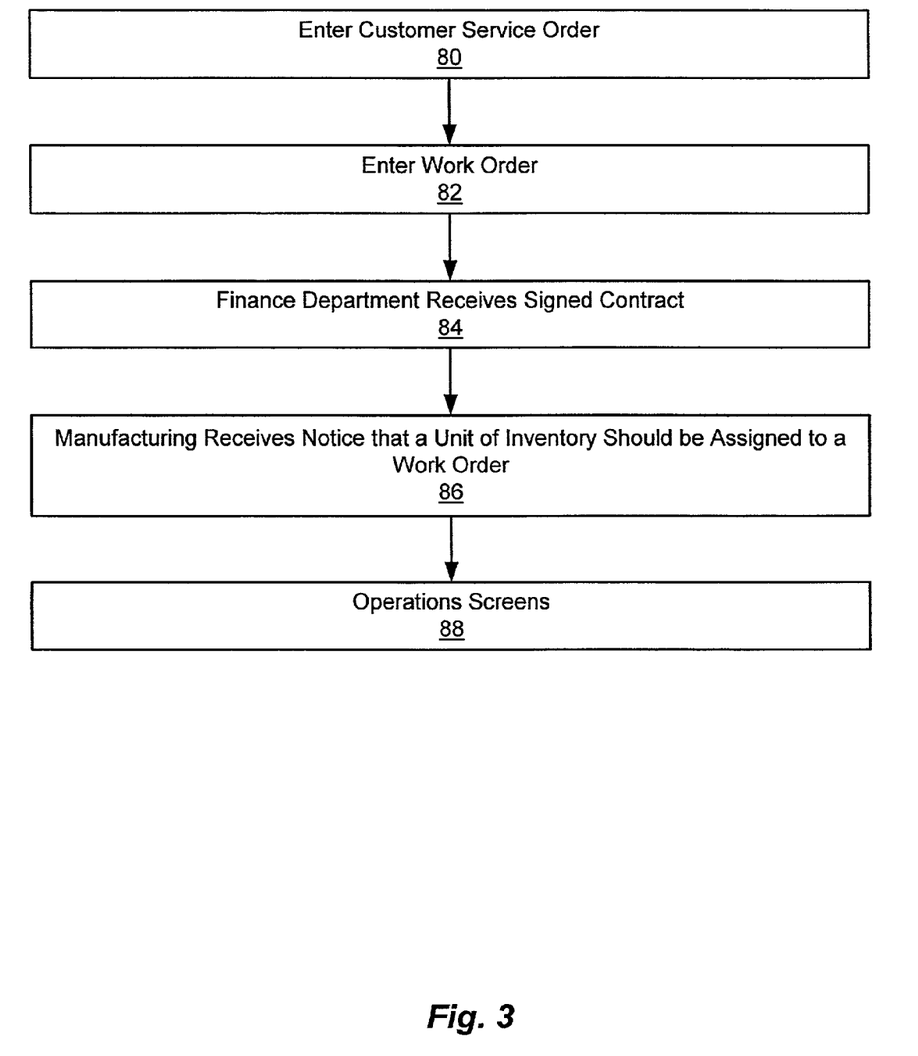
FIG. 3 is a flow chart showing steps performed during operation of an illustrative embodiment of the disclosed system in order to establish customer specific information at a remote data center.

FIG. 3 is a flow chart showing steps performed during operation of the illustrative embodiment in order to establish customer specific information at the Remote Data Center 16. The customer specific information established through the steps shown in FIG. 3 may subsequently be used to configure and/or provision one of the disclosed Infrastructure Management Appliances 10 after it has been delivered to the customer premises. Delivery of such customer specific information may be accomplished through the steps described in FIGS. 6 and 7. The steps of FIG. 3 are an example of steps performed in connection with performing step 60 as shown in FIG. 2.

At step 80 of FIG. 3, a service order is entered into the disclosed system. For example, a user interface to one of the servers 30 shown in FIG. 1 may be provided to receive purchase orders and/or service orders. The purchase order entered at step 80 may indicate that a customer has ordered a Infrastructure Management Appliance 10. One example of a commercially available interface that may be employed in connection with the entry of a service or work order at step 80 is that provided in connection with the Action Request System® distributed by Remedy Corporation.

At step 82, a work order may also be entered through one of the servers 30 shown in FIG. 1. A similar or common interface as used in step 80 may be used to enter the work order at step 82. Through the entry of the customer service order at step 80, and the work order entered at step 82, various customer specific operational characteristics are provided into a database of customer specific information. The customer specific information thus provided may describe the specific managed objects that are to be monitored by a corresponding Infrastructure Management Appliance 10 that has been ordered by a specific customer. Such customer specific information may further indicate one or more management applications that have been licensed by that customer, and that are to be executed on the Infrastructure Management Appliance. All such customer specific information is then stored in one or more databases maintained by the Remote Data Center 16. Customer specific operational characteristics may be associated and indexed, for example, by one or more hardware embedded addresses of network interfaces of Infrastructure Management Appliances 10. In this way, the specific operational characteristics for a customer are associated with, and may be accessed by, the Infrastructure Management Appliance(s) 10 that are sent to that customer.

At step 84, a signed contract associated with the customer service order entered at step 80 and the work order entered at step 82 is received by a finance function of the business entity providing the infrastructure management appliance to the customer. The receipt of the signed contract, or other confirmation of the order at step 84 triggers delivery of a notice to the manufacturing function that a Infrastructure Management Appliance 10 should be assigned to the work order entered at step 82. The notice provided at step 86 may be delivered through any appropriate mechanism, such as electronic mail (email). A number of operation screens are then presented at step 88 through a user interface to enable entry of further data regarding delivery of the Infrastructure Management Appliance 10 to the customer. The actions triggered by the operation screens include loading of customer specific information from the Remote Data Center 16 to the Infrastructure Management Appliance 10. An example of steps performed in this regard is described in connection with FIGS. 6 and 7, which illustrate the loading of control information, such as application software, configuration information, and/or related schema from the Remote Data Center 16 to the Infrastructure Management Appliance 10.

Figure 4:
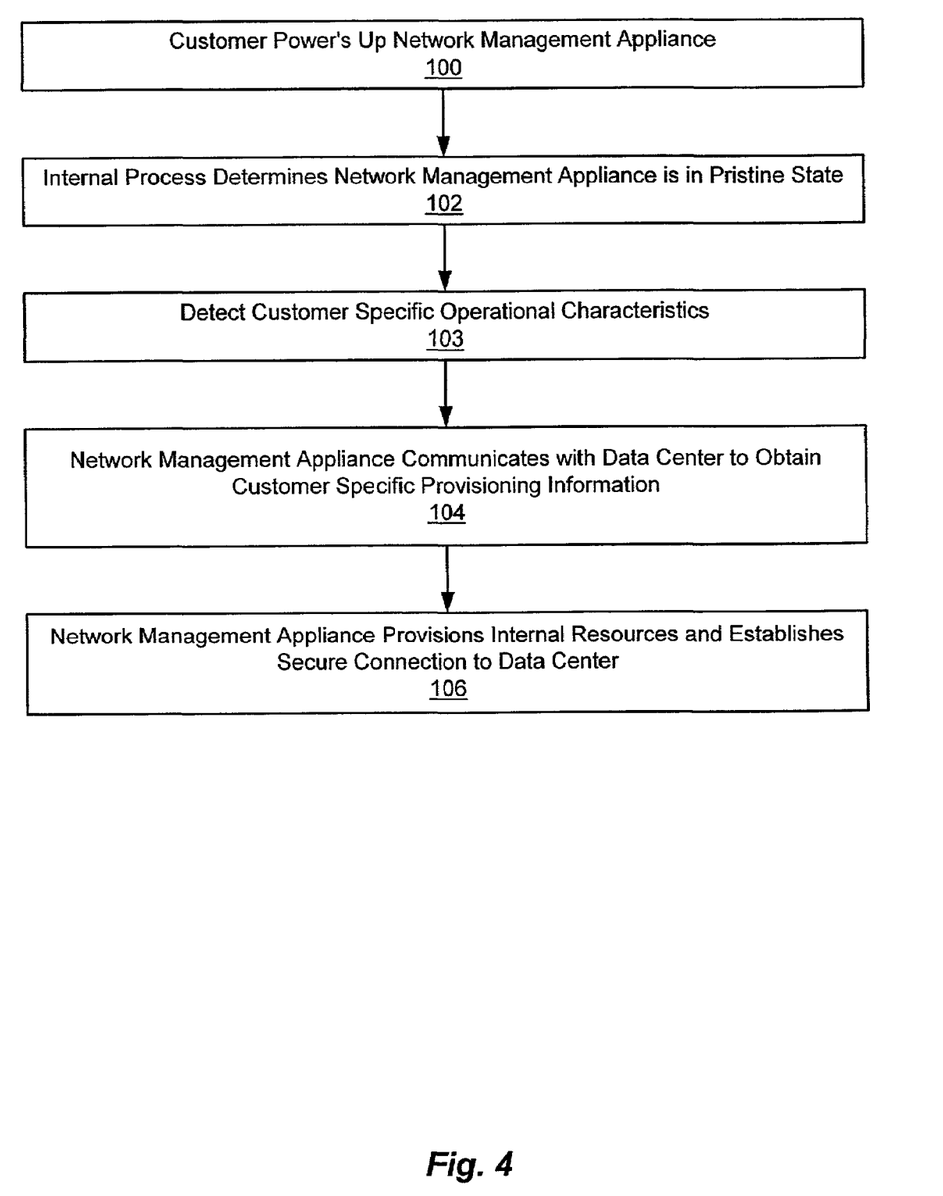
FIG. 4 is a flow chart showing steps performed during operation of an illustrative embodiment of the disclosed system upon power up of the disclosed infrastructure management appliance.

FIG. 4 shows steps performed during operation of an illustrative embodiment of the disclosed system upon power up of the disclosed Infrastructure Management Appliance 10. The steps of FIG. 4 illustrate a process performed in connection with step 64 of FIG. 2. At step 100, the customer receives the Infrastructure Management Appliance 10, connects the interfaces of the Infrastructure Management Appliance 10 to the customer's internal network 12, and turns on the device's power. At step 102, the Infrastructure Management Appliance determines that it is in an initial state, and that it must therefore discover information regarding its operational environment, and obtain customer specific configuration information from the Remote Data Center 16. Accordingly, at step 103, the Infrastructure Management Appliance 10 detects some number of customer specific operational characteristics. For example, the Infrastructure Management Appliance 10 may operate at step 103 to determine a prefix for use when forming the dial up connection 20 shown in FIG. 1. Such a determination may, for example, be accomplished by trying one or more of the more common dial out prefixes. Such dial out prefixes are those numbers required to be entered into an internal telephone system prior to calling outside of the internal telephone network. Examples of common dial out prefixes are the numbers 8 and 9. The Infrastructure Management Appliance 10 may further operate at step 103 to determine its own Media Access Control (MAC) layer address, for indicating to the Remote Data Center 16 which user specific information is to be applied to the Infrastructure Management Appliance 10.

At step 104, the operations layer software of the Infrastructure Management Appliance 10 communicates with the Remote Data Center 16 to obtain customer specific information, such as provisioning information. The customer specific provisioning information obtained at step 104 may, for example, be obtained over the dial-up connection 20 between the Infrastructure Management Appliance 10 and the Remote Data Center 16 shown in FIG. 1. In the illustrative embodiment, a configuration file obtained by the Infrastructure Management Appliance 10 from the remote Data Center at step 104 includes information such as the IP address to be used by the Infrastructure Management Appliance 10, the system name of the Infrastructure Management Appliance 10, the default gateway for the customer network, information regarding the time zone in which the Infrastructure Management Appliance is located, a CHAP username and password, and possibly other information regarding the VPN to be established between the Infrastructure Management Appliance 10 and the remote Data Center.

Following receipt of the provisioning information obtained from the Remote Data Center 16 at step 104, the operations layer software of the Infrastructure Management Appliance 10 applies the provisioning information at step 106 to its internal resources, and establishes a secure connection to the Remote Data Center 16 at step 106. The secure connection to the Remote Data Center 16 may, for example, consist of the Virtual Private Network (VPN) 24 connecting the Infrastructure Management Appliance 10 and the Remote Data Center 16 (FIG. 1).

Figure 5:
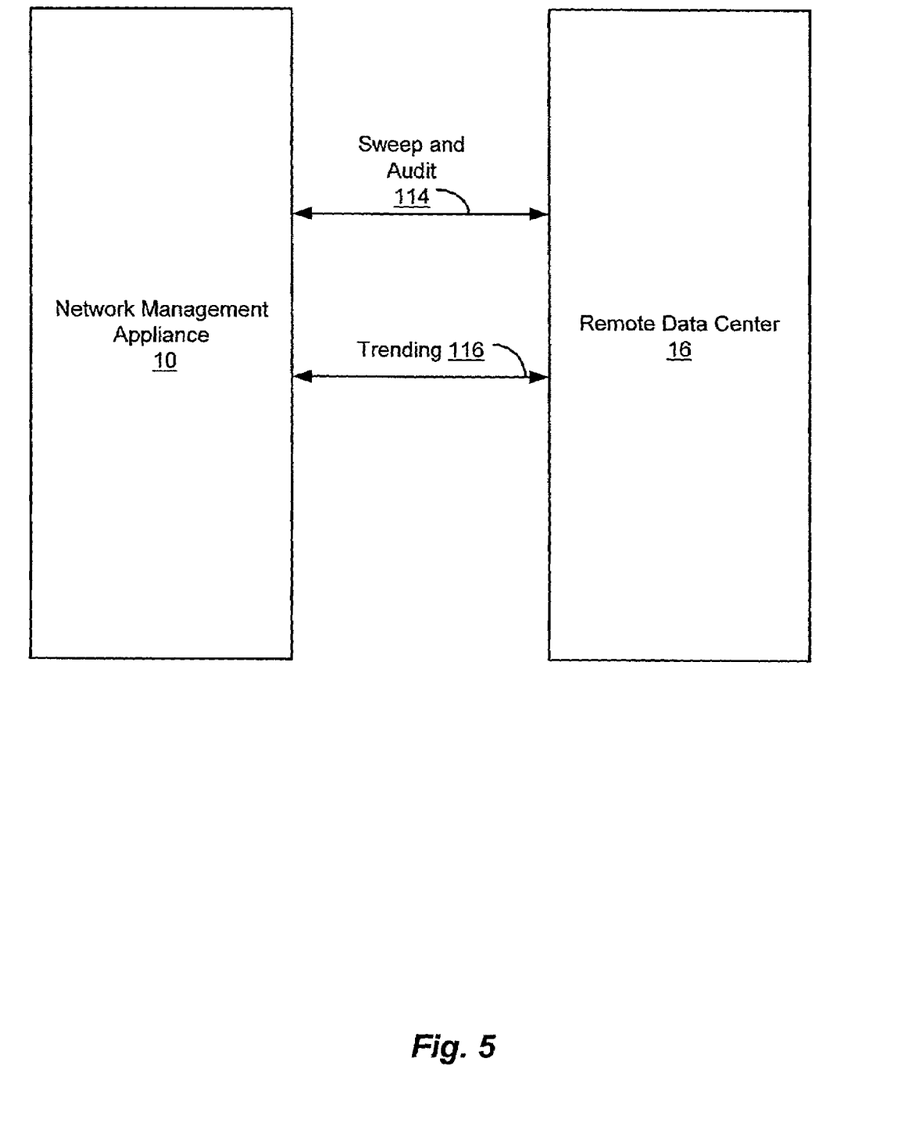
FIG. 5 illustrates interactions between the remote data center and the infrastructure management appliance in an illustrative embodiment.

FIG. 5 shows interactions between the Remote Data Center 16 and the Infrastructure Management Appliance 10 of FIG. 1. As shown in FIG. 5, the Infrastructure Management Appliance 10 communicates with the Remote Data Center 16 in terms of sweep and audit activities 114, and trending 116. The sweep and audit activities 114, for example, represent interactions between the operations layer software and the system monitoring functionality in the servers 30 of the Remote Data Center 16. Such appliance monitoring may include actions designed to enable proactive event detection with regard to failures or performance problems within the Infrastructure Management Appliance 10. In one embodiment, an Infrastructure Management Appliance 10 operates within the Remote Data Center 16 to monitor the status and performance of Infrastructure Management Appliances 10 located on customer premises that are associated with the Remote Data Center 16. The sweep and audit operations 114 between the Infrastructure Management Appliance 10 and the Remote Data Center 16 may, for example, form an underlying process that provides data to a central console function of the disclosed system. Specifically, the disclosed system operates to "sweep" the infrastructure management appliances in the field for operational status and perform a security "audit" of the infrastructure management appliances in the field for irregularities. Such auditing may, for example, including reading various logs of activities maintained at the respective infrastructure management appliances. Such logs may indicate who has logged in to a given system at what time.

Trending 116 illustrates the activities of the operations layer software within the Infrastructure Management Appliance 10 and a trending function within the server software 30 of the Remote Data Center 16. The trending 116 includes storing raw monitoring data collected by the Infrastructure Management Appliance 10 into one or more databases within the Remote Data Center 16. For example, the Infrastructure Management Appliance 10 may operate to store some predetermined number of days worth of raw monitoring data on behalf of the customer, e.g. monitoring data obtained over the preceding seven (7) days. Such data is referred to herein as "trend" data for a given customer. Each day, the Infrastructure Management Appliance 10 further operate to store one day's worth of trending data within a database of the Remote Data Center 16. This periodic pushing of data to the Remote Data Center 16 may be used to provide relatively long term trending data coverage. The trending data stored within the Infrastructure Management Appliance 10 and the Remote Data Center 16 may then be used to compile statistics on the performance of various services within the customer's information technology infrastructure. In a further aspect of the disclosed system, if the Infrastructure Management Appliance 10 is unable to successfully store monitoring data to the Remote Data Center 16 on a given day, for example due to lack of network availability, it may then operate to store that day's worth of monitoring data on the following day if possible. Moreover, trend data stored within the Remote Data Center 16 may be used to ensure that a predetermined number of day's worth of trend data, e.g. seven (7) days worth, is stored within the Infrastructure Management Appliance 10. For example, if the Infrastructure Management Appliance 10 loses its trend data, it may request a reload of some number of day's worth of trend data from the Remote Data Center 16.

Figure 6:
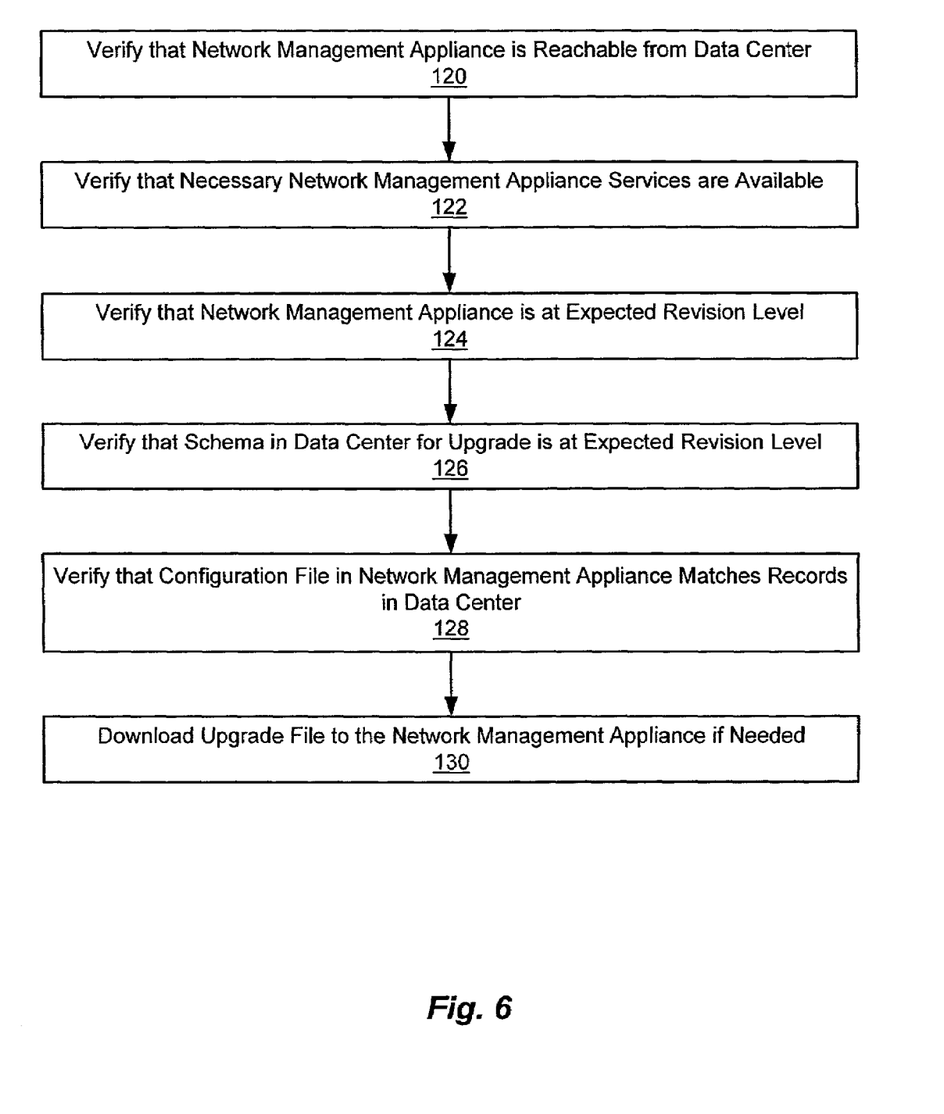
FIG. 6 is a flow chart illustrating steps performed by an illustrative embodiment of the disclosed system to prepare for loading configuration information and/or new functionality into an infrastructure management appliance.
Figure 7:
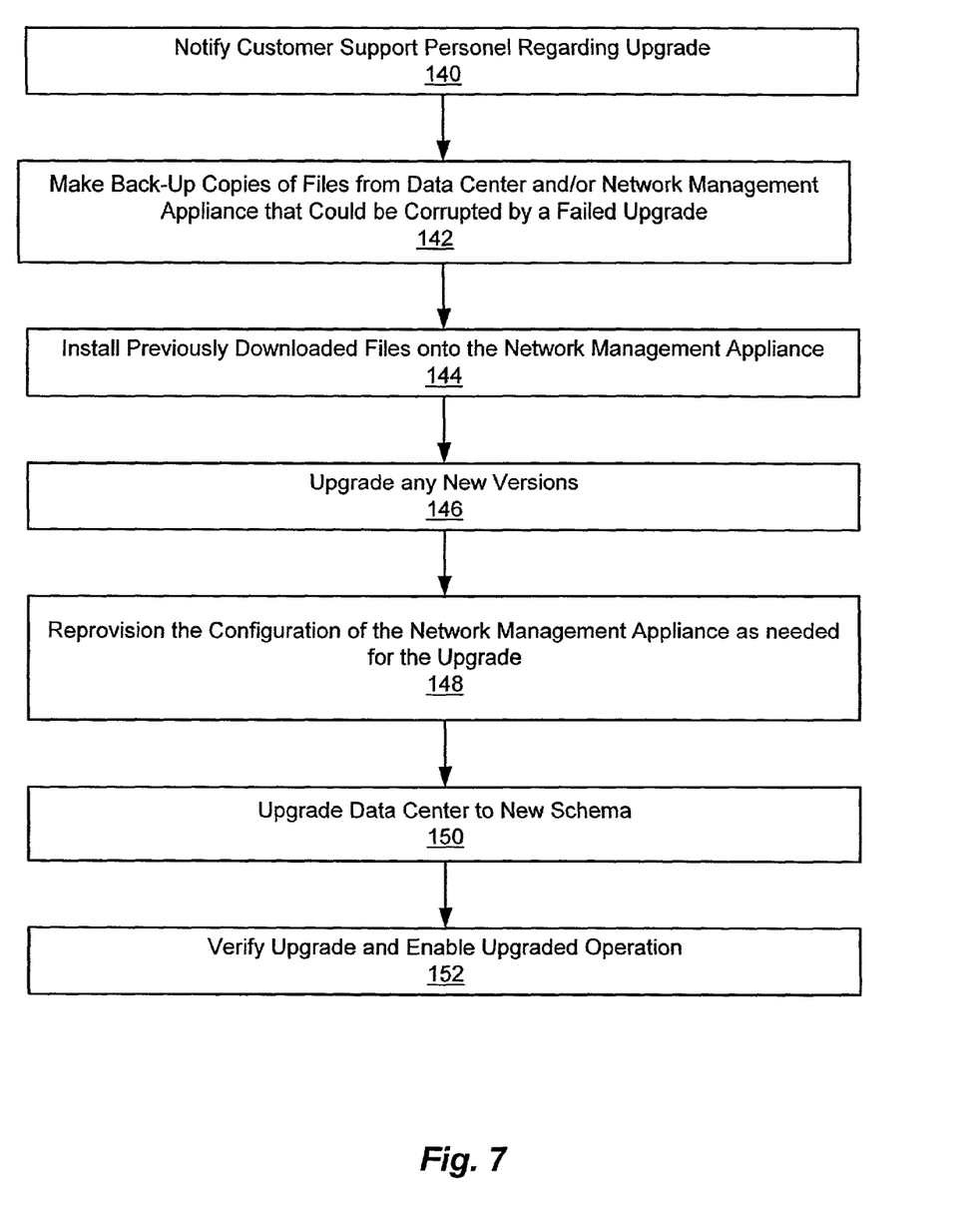
FIG. 7 is a flow chart illustrating steps performed by an illustrative embodiment of the disclosed system to load configuration information and/or new functionality into an infrastructure management appliance.

FIG. 6 shows steps performed by the illustrative embodiment of the disclosed system in order to prepare for downloading operational information, such as a schema upgrade, to an Infrastructure Management Appliance 10. The steps shown in FIG. 6 may, for example, be performed by a master controller process within the operations layer 46 of the Infrastructure Management Appliance 10, in cooperation with the system control functionality of the Remote Data Center 16. The steps described in connection with FIGS. 6 and 7 illustrate an example of a process for implementing the functionality upgrade performed in step 70 of FIG. 2. The steps shown in FIGS. 6 and 7 further illustrate the steps used to download customer specific information from the Remote Data Center 16 to the Infrastructure Management Appliance 10. In an exemplary embodiment, the functionality upgrade performed through the steps shown in FIGS. 6 and 7 includes transfer of an upgraded XML schema to the Infrastructure Management Appliance 10 from the Remote Data Center 16. Alternatively, any type of information may be conveyed to the Infrastructure Management Appliance 10 through the steps shown in FIGS. 6 and 7, including one or more management application programs, executable code, configuration information, and/or other information appropriate for upgrading the functionality of a specific implementation of the disclosed system.

In step 120 of FIG. 6, the system control functionality of the Remote Data Center 16 verifies that the Infrastructure Management Appliance 10 is reachable from the Remote Data Center 16. For example, the Remote Data Center 16 may determine whether or not the Infrastructure Management Appliance 10 is reachable over the secure connection 24 between the Remote Data Center 16 and the Infrastructure Management Appliance 10 at step 120.

If the Remote Data Center 16 determines that the Infrastructure Management Appliance 10 is reachable at step 120, then at step 122 the Remote Data Center 16 verifies that any services within the Infrastructure Management Appliance 10 that are required to perform the upgrade are available, such as the database and the master controller process within the Infrastructure Management Appliance 10. In the case where all such necessary services are determined to be available, the Remote Data Center 16 verifies at step 124 that the current functionality within the Infrastructure Management Appliance 10 is at an expected revision level. For example, in the case of an upgrade from revision 1.0 XML schema to revision 1.1 XML schema, the Remote Data Center 16 may verify that the current schema revision in the Infrastructure Management Appliance 10 is 1.0 at step 124. Similarly, the Remote Data Center 16 verifies at step 126 that the functionality upgrade information in the Remote Data Center 16 is at the appropriate revision at step 126. Thus the Remote Data Center 16 would verify that the upgrade information in the above example would be revision 1.1 schema.

At step 128, the Remote Data Center 16 verifies that the contents of a configuration file on the Infrastructure Management Appliance 10 matches a current record of the configuration file stored within the Remote Data Center 16. Information within the configuration file may, for example, indicate which management applications are currently supported on the Infrastructure Management Appliance 10 prior to performing the upgrade.

In the case where any of the verifications in steps 120, 122, 124, 126, 128 and 130 fails, the disclosed system may notify a system operator. In such an event, the system operator may then take whatever actions are required to resolve the detected problem. Those skilled in the art will recognize that the order of the verifications in steps 120, 122, 124, 126, 128 and 130 as shown in FIG. 7 is purely for purposes of illustration, and that these verifications may alternatively be performed in other orders.

Otherwise, in the event that all verifications in step 120, 122, 124, 126, 128 and 130 pass, then at step 130 the Remote Data Center 16 will determine whether the upgrade file(s) are present in the Infrastructure Management Appliance 10. The disclosed system may further verify that a checksum for one or more of the files used for the upgrade matches a stored copy of the checksum for the files. If any of the files necessary for the upgrade are not present within the Infrastructure Management Appliance 10, or have been corrupted, then the Remote Data Center 16 downloads those files to the Infrastructure Management Appliance 10 at step 130.

FIG. 7 shows steps performed by the illustrative embodiment of the disclosed system to upgrade schema within a Infrastructure Management Appliance 10. The steps shown in FIG. 7 are performed in the event that the verifications described with reference to FIG. 6 succeed, thus indicating that the Infrastructure Management Appliance 10 is ready to be upgraded. At step 140 of FIG. 7, notification is provided to the customer's support personnel regarding the upgrade. This notification is provided so that the customer's IT support personnel can inform user's of the customer's systems that the Infrastructure Management Appliance 10 will not be available during the upgrade. At step 142, back-up copies are made of files on the Infrastructure Management Appliance 10 and/or files stored in the Remote Data Center 16 that could be jeopardized during a failed upgrade process. Such backup copies may be stored either within the Infrastructure Management Appliance 10, or within a system located in the Remote Data Center 16.

At step 144 of FIG. 7, the upgrade file or files, such as those downloaded to the Infrastructure Management Appliance 10 at step 130 of FIG. 6, are installed in the Infrastructure Management Appliance 10. Step 130 may include opening archived files that were previously loaded onto the Infrastructure Management Appliance 10, and/or removing any old software packages no longer used in the upgraded configuration. At step 146, the disclosed system operates to upgrade any management applications on the Infrastructure Management Appliance 10 for which new versions have been provided.

At step 148 of FIG. 7, the disclosed system re-provisions the Infrastructure Management Appliance 10 as needed to support any newly upgraded applications. Schema being used in the Remote Data Center 16 systems is then upgraded at step 150. Finally, at step 152, the upgraded files are confirmed to be present in both the Infrastructure Management Appliance 10 and the systems of the Remote Data Center 16, and operation is re-enabled.

Those skilled in the art should readily appreciate that programs defining the functions of the disclosed system and method for determining deadlock-free routes can be implemented in software and delivered to a system for execution in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem. In addition, while the illustrative embodiments may be implemented in computer software, the functions within the illustrative embodiments may alternatively be embodied in part or in whole using hardware components such as Application Specific Integrated Circuits, Field Programmable Gate Arrays, or other hardware, or in some combination of hardware components and software components.

While the invention is described through the above exemplary embodiments, it will be understood by those of ordinary skill in the art that modification to and variation of the illustrated embodiments may be made without departing from the inventive concepts herein disclosed. Accordingly, the invention should not be viewed as limited except by the scope and spirit of the appended claims.

What is claimed is:

1. A distributed method of performing network monitoring, comprising:

obtaining, by an infrastructure management appliance, customer specific information for establishing a secure virtual connection with a remote data center, said customer specific information being obtained from said remote data center via a first communication interface to said infrastructure management appliance, wherein said remote data center is connected to a public network, wherein said infrastructure management appliance is connected to a customer network via a second communication interface to said infrastructure management appliance, and wherein said infrastructure management appliance is connectable to said public network via said second communication interface and said customer network;

establishing, responsive to said customer specific information obtained via said first communication interface, said secure virtual connection with said remote data center by said infrastructure management appliance, wherein said secure virtual connection with the remote data center is established over said public network via said second communication interface to said infrastructure management appliance;

monitoring, by said infrastructure management appliance, at least one customer resource, the customer resource being connected to the customer network, wherein the monitoring step includes monitoring the customer resource over the customer network; and transmitting information obtained through said monitoring of said customer resource to said remote data center via said secure virtual connection.

2. The method of claim 1, wherein said establishing said secure virtual connection with said remote data center comprises establishing a virtual private network with said remote data center.

3. The method of claim 1, wherein said monitoring of said at least one customer resource is performed over said second interface to said infrastructure management appliance.

4. The method of claim 1, wherein said obtaining of said customer specific information over said first interface to said infrastructure management appliance comprises obtaining said customer specific information through dial up access over a serial line to said data center.

5. The method of claim 1, wherein said obtaining of said customer specific information further comprises obtaining an network address of said infrastructure management appliance from said remote data center.

6. The method of claim 5, wherein said obtaining of said network address of said infrastructure management appliance comprising obtaining an Internet Protocol (IP) address from said remote data center.

7. The method of claim 1, wherein said monitoring of said at least one customer resource comprises periodically polling of a server system to determine whether said server system is in an operational state.

8. The method of claim 1, wherein said monitoring of said at least one customer resource comprises generating a synthetic transaction with respect to at least one customer application, and storing a result obtained from said customer application in response to said synthetic transaction.

9. The method of claim 1, further comprising:

discovering at least one customer operational environment attribute; and configuring said first interface to said infrastructure management appliance in response to said at least one customer operational environment attribute.

10. The method of claim 9, wherein said at least one customer operational environment comprises a dial-out prefix.

11. An infrastructure management appliance, comprising:

a first communication interface;

a second communication interface;

at least one processor;

at least one memory, said memory operable to store program code executable on said at least one processor, wherein said program code includes:

program code for obtaining customer specific information for establishing a secure virtual connection with a remote data center, said customer specific information being obtained from said remote data center via said first communication interface;

program code for establishing, responsive to said customer specific information, said secure virtual connection with said remote data center, the infrastructure management appliance being connectable to a customer network, the remote data center being connected to a public network, the customer network being connectable to the public network, wherein the program code for establishing a secure virtual connection is operable to establish the secure virtual connection with the remote data center over the public network via said second communication interface;

program code for monitoring at least one customer resource, the customer resource being connected to the customer network, wherein the program code for monitoring at least one customer resource is operable to monitor the customer resource over the customer network; and program code for transmitting information obtained through said monitoring of said customer resource to said remote data center via said secure virtual connection.

12. The infrastructure management appliance of claim 11, wherein said program code for establishing said secure virtual connection with said remote data center comprises program code for establishing a virtual private network with said remote data center.

13. The infrastructure management appliance of claim 11, wherein said program code for monitoring said at least one customer resource monitors said at least one customer resource over said second communication interface.

14. The infrastructure management appliance of claim 11, wherein said program code for obtaining said customer specific information obtains said customer specific information over said first communication interface, and wherein said first communication interface provides dial up access over a serial line to said remote data center.

15. The infrastructure management appliance of claim 11, wherein said program code for obtaining said customer specific information further comprises program code for obtaining a network address of said infrastructure management appliance from said remote data center.

16. The infrastructure management appliance of claim 15, wherein said program code for obtaining said network address of said infrastructure management appliance comprises program code for obtaining an Internet Protocol (IP) address from said remote data center.

17. The infrastructure management appliance of claim 11, wherein said program code for monitoring of said at least one customer resource comprises program code for periodically polling a server system to determine whether said server system is in an operational state.

18. The infrastructure management appliance of claim 11, wherein said program code for monitoring said at least one customer resource comprises program code for generating a synthetic transaction with respect to at least one customer application, and program code for storing a result obtained from maid customer application in response to said synthetic transaction.

19. The infrastructure management appliance of claim 11, further comprising:
  program code for discovering at least one customer operational environment attribute; and
  program code for configuring said first communication interface in response to said at least one customer operational environment attribute.

20. The infrastructure management appliance of claim 19, wherein said at least one customer operational environment attribute comprises a dial-out prefix.

21. A distributed system for performing network monitoring, comprising:
  a public network;
  a remote data center connected to said public network;
  a customer network connectable to said public network;
  an infrastructure management appliance connected to said customer network, said infrastructure management appliance having a first communication interface and a second communication interface;
  means for obtaining, by said infrastructure management appliance, customer specific information for establishing a secure virtual connection with a remote data center, said customer specific information being obtained from said remote data center via said first communication interface to said infrastructure management appliance;
  means for establishing, by said infrastructure management appliance, said secure virtual connection with the remote data center over the public network via said second communication interface to said infrastructure management appliance,
  wherein said means for establishing said secure virtual connection with said remote data center is responsive to said customer specific information obtained from said remote data center via said first communication interface to said infrastructure management appliance;
  means for monitoring, by said infrastructure management appliance, at least one customer resource, said at least one customer resource being connected to the customer network, wherein said means for monitoring the at least one customer resource is operable to monitor the customer resource over the customer network; and
  means for transmitting information obtained through said monitoring of said customer resource to said remote data center via said secure virtual connection.

* * * * *